United States Patent
Keating et al.

(10) Patent No.: US 11,950,169 B2
(45) Date of Patent: Apr. 2, 2024

(54) UPLINK POSITIONING METHODS AND APPARATUSES FOR NON-TERRESTRIAL NETWORKS

(71) Applicant: Nokia Technologies Oy, Espoo (FI)

(72) Inventors: Ryan Keating, Chicago, IL (US); Rapeepat Ratasuk, Inverness, IL (US); Tzu-Chung Hsieh, Hoffman Estates, IL (US)

(73) Assignee: NOKIA TECHNOLOGIES OY, Espoo (FI)

( * ) Notice: Subject to any disclaimer, the term of this patent is extended or adjusted under 35 U.S.C. 154(b) by 398 days.

(21) Appl. No.: 17/604,120

(22) PCT Filed: Apr. 28, 2020

(86) PCT No.: PCT/IB2020/054002
§ 371 (c)(1),
(2) Date: Oct. 15, 2021

(87) PCT Pub. No.: WO2020/222122
PCT Pub. Date: Nov. 5, 2020

(65) Prior Publication Data
US 2022/0210612 A1    Jun. 30, 2022

Related U.S. Application Data

(60) Provisional application No. 62/842,040, filed on May 2, 2019.

(51) Int. Cl.
*H04W 4/02* (2018.01)
*G01S 19/01* (2010.01)
*H04W 4/029* (2018.01)

(52) U.S. Cl.
CPC ............ *H04W 4/029* (2018.02); *G01S 19/01* (2013.01)

(58) Field of Classification Search
CPC .... G01S 11/02; G01S 19/01; G01S 2205/008; G01S 2205/01; G01S 5/017;
(Continued)

(56) References Cited

U.S. PATENT DOCUMENTS

| 5,327,144 A | 7/1994 | Stilp et al. |
| 2020/0275427 A1* | 8/2020 | Hooli .................. G01S 5/06 |

FOREIGN PATENT DOCUMENTS

WO    2014/027941 A1    2/2014

OTHER PUBLICATIONS

3GPP TS 38.305: "Stage 2 functional specification of User Equipment (UE) positioning in NG-RAN", V15.3.0 (Mar. 2019) (Year: 2019).*

(Continued)

*Primary Examiner* — Nader Bolourchi
(74) *Attorney, Agent, or Firm* — Robert P. Michal, Esq.; Carter, DeLuca & Farrell LLP (57) ABSTRACT

Apparatus, methods and computer program products for user equipment positioning solutions and related signalling. An apparatus comprising at least one processor and at least one memory including computer program code, the at least one memory and the computer program code are configured, with the at least one processor, to cause the apparatus to at least send (550), to a network node of a communication network, at least one signaling configuration with at least one set periodicity, wherein the at least one signaling configuration is for use at the network node in calculating at least position information for relaying to the communication network at least for positioning support of the apparatus, and receive (570) the positioning support from the communication network in response to the at least one signaling configuration.

10 Claims, 6 Drawing Sheets

(58) Field of Classification Search
CPC .. G01S 5/0249; H04B 7/18547; H04W 4/029; H04W 64/00; H04W 64/006; H04W 84/06; H04W 88/08
See application file for complete search history.

(56) References Cited

OTHER PUBLICATIONS

"3rd Generation Partnership Project; Technical Specification Group Radio Access Network; Study on New Radio (NR) to support non terrestrial networks (Release 15)", 3GPP TR 38.811, V15.0.0, Jun. 2018, pp. 1-118.

"Study on solutions for NR to support non-terrestrial networks (NTN)", 3GPP TSG RAN meeting #82, RP-182880, Agenda: 9.3.1, Thales, Dec. 10-13, 2018, 6 pages.

"Revised SID: Study on NR positioning support", 3GPP TSG RAN Meeting #81, RP-182155, Agenda: 9.3.18, Intel Corporation, Sep. 10-13, 2018, 6 pages.

International Search Report and Written Opinion received for corresponding Patent Cooperation Treaty Application No. PCT/IB2020/054002, dated Jul. 22, 2020, 15 pages.

"Uplink NR TDOA Design", 3GPP TSG RAN WG1 Meeting 96, R1-1903053, Agenda: 2.10.1.2, Fraunhofer IIS, Feb. 25-Mar. 1, 2019, 16 pages.

"Aspects of UL-based NR positioning techniques", 3GPP TSG RAN WC1 Meeting AH-1901, R2-1901183, Agenda: 7.2.10.1.2, Fraunhofer IIS, Jan. 21-25, 2019, 8 pages.

"DL and UL NR Positioning Procedures", 3GPP TSG-RAN WG2 Meeting #105bis, R2-1903135, Agenda: 11.8.2.1, Qualcomm Incorporated, Apr. 8-12, 2019, 5 pages.

"NR-NTN: Chap 7.3—NR modifications to support the Non Terrestrial Network deployment scenarios", 3GPP TSG RAN1 Meeting #93, R1-1807794, Agenda: 7.3.2, Thales, May 21-25, 2018, 44 pages.

"(TP for TR 38.821) NTN Multi-Hop Related Architectures", 3GPP TSG RAN WG3#101bis, R3-185412, ZTE, Oct. 8-12, 2018, 5 pages.

"(TP for TR 38.821) Refinement of NTN Architectures", 3GPP TSG RAN WG3#101bis, R3-185410, ZTE, Oct. 8-12, 2018, 8 pages.

"3rd Generation Partnership Project; Technical Specification Group Radio Access Network; Study on NR positioning support (Release 16)", 3GPP TR 38.855, V16.0.0, Mar. 2019, pp. 1-197.

"3rd Generation Partnership Project; Technical Specification Group Radio Access Network; NG Radio Access Network (NG-RAN); Stage 2 functional specification of User Equipment (UE) positioning in NG-RAN (Release 15)", 3GPP TS 38.305 V15.3.0, Mar. 2019, pp. 1-69.

"3rd Generation Partnership Project; Technical Specification Group Radio Access Network; Solutions for NR to support non-terrestrial networks (NTN) (Release 16)", 3GPP TR 38.821, V0.4.0, Mar. 2019, pp. 1-46.

* cited by examiner

UPLINK POSITIONING METHODS AND APPARATUSES FOR NON-TERRESTRIAL NETWORKS

RELATED APPLICATION

This application claims priority to PCT Application No. PCT/IB2020/054002, filed on Apr. 28, 2020, which claims priority to U.S. Application No. 62/842,040, filed on May 2, 2019, each of which is incorporated herein by reference in its entirety.

TECHNICAL FIELD

The teachings in accordance with the exemplary embodiments of this invention relate generally to user equipment positioning solutions and related signalling and, more specifically, relate to user equipment positioning solutions using the uplink of a non-terrestrial network.

BACKGROUND

This section is intended to provide a background or context to the invention that is recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

Certain abbreviations that may be found in the description and/or in the Figures are herewith defined as follows:
DCI downlink control information
GEO geostationary earth orbit
gNB 5G base station
GNSS global navigation satellite system
HAPS high-altitude platform systems
IoT Internet of things
LEO low earth orbit
LMF location management function
LMU location measurement unit
NR new radio (5G)
NRPPa new radio positioning protocol A
NTN non terrestrial network
OTDOA observed time difference of arrival
RAT radio access technology
RS reference signal
SRS sounding reference signal
TA timing advance
TMF transmission measurement function
TOA time of arrival
UE user equipment
TDOA time difference of arrival
UTDOA uplink time difference of arrival At the time of this application 3GPP is studying how to enable non-terrestrial networks (NTN) using New Radio (NR). Some of this effort is detailed in 3GPP TR 38.821 (Solutions for NR to support non-terrestrial networks) in which a focus includes how to provide coverage everywhere on the globe. At the time of this application multiple architecture solutions are under study for the 3 satellite categories; Geostationary Earth Orbit (GEO), Low-Earth Orbit (LEO), and High-Altitude Platform Systems (HAPS).

Example embodiments of this invention work to improve at least user equipment positioning operations to improve operations associated with such New Radio network implementations.

BRIEF DESCRIPTION OF THE DRAWINGS

The above and other aspects, features, and benefits of various embodiments of the present disclosure will become more fully apparent from the following detailed description with reference to the accompanying drawings, in which like reference signs are used to designate like or equivalent elements. The drawings are illustrated for facilitating better understanding of the embodiments of the disclosure and are not necessarily drawn to scale, in which.

DETAILED DESCRIPTION

In example embodiments of the invention, there is proposed improved operations for user equipment positioning solutions using the uplink of a non-terrestrial network.

The feasibility of utilizing 5G NR air interface to support non-terrestrial networks (NTN) is currently being investigated in 3GPP. In an NTN system, 5G base stations (gNB) or part of gNB processing functions are deployed on board satellites to provide communication coverage over a very large area that may be otherwise unreachable by cellular networks. It can be used to connect IoT devices globally as well as provide personal communication in remote areas and in disaster relief.

Positioning support has been added to NR as the ability of the network to know the position of user equipment (UE) becomes more important for future network applications. The study item on NR positioning in 3GPP has focused mostly on higher accuracy methods and is planning to specify a few methods for positioning of UEs. Some methods rely on timing based measurements, for example Observed Time Difference of Arrival (OTDOA) and Uplink Time Difference of Arrival (UTDOA). Using the time difference of arrival measurements and the known positions of the gNBs, the network can estimate the position of the UE. These positioning methods are so called RAT-dependent methods. In 5G NR, OTDOA may be called Downlink Time Difference of Arrival (DL-TDOA) and UTDOA may be referred to as UL-TDOA. There are also RAT-independent methods such as Global Navigation Satellite System (GNSS).

Low earth orbit (LEO) satellites, which are being studied to support NTN, typically move at 7.5 km/s relative to a fixed earth point.

The position of the UE may be desired by the satellite for several reasons. If some location functionality is on satellite, then the position may be known locally and can be used for handover. However, in standards at the time of this application problems can be bad.

For example, in NTN the current NR positioning methods are not suitable. Almost all the positioning methods rely on multiple gNBs either making measurements based on UE UL signals or transmitting DL signals for the UE to make measurements on. This is problematic for NTN as there are many scenarios in which the UE is only able to communicate with or perform measurement on a single gNB. Enhance Cell ID (ECID) is a positioning method which requires only a single gNB but is problematic for NTN due to the large footprint size of a cell compared with terrestrial networks.

DL positioning methods for NTN are possible but may be costly for the UE to make measurements in terms of power consumption. A UE report may also be required for DL techniques. Example embodiments of this invention address the problem of UE positioning in NTN using UL signals and reception of the UL signals by only one gNB UTDOA positioning methods have been around for terrestrial networks for some time. In UTDOA the location measurement units (LMUs) rely on measuring the TOA of a common SRS. It is noted that the LMU may be referred to as a transmission management function (TMF). The time difference is calculated between the LMUs and used for the positioning calculation. It is assumed that the location of the LMUs is static. Embodiments of this invention are somewhat analogous to UTDOA but for a single gNB that is moving. In UTDOA, a common SRS is also used to eventually determine the time difference of arrival (TDOA). The invention uses TOA to calculate the position as opposed to TDOA.

GNSS methods are used by many outdoor UEs to find their position. However, for cost reasons it is advantageous for the UE to not rely on GNSS for positioning support. GNSS positioning calculation is also performed at the UE side and then would need to be reported to the gNB. This requires an additional report and transmission from the UE side.

In accordance with example embodiments of the invention there is a UE positioning solution using the UL of a non-terrestrial network (NTN) system and related signaling.

In some example embodiments of the invention the movement of a gNB radio unit is used to make at least three positioning related measurements at different points in time. For example, as a LEO satellite moves, the satellite can use its positions at different points in time to determine the position of the UE within its coverage area via a trilateration algorithm. In some embodiments, the positioning related measurements may be time of arrival (TOA) measurements. Using the position of the gNB radio unit at the different points in time where the measurements are made and the at least three TOA measurements the position of a UE is estimated. For example, a trilateration algorithm may be used.

In some example embodiments of the invention the mobility of the UE may first be estimated using an initial signaling configuration. A second signaling configuration may then be used to facilitate the TOA measurements. The second signaling configuration details, including a periodicity or time instance, may depend on the mobility estimation performed using the first signaling configuration.

It is noted that where the terms related to "periodicity" or "time instance" are not limiting. These terms may be used interchangeably and can relate to a period of time which may occur more than one time during a particular interval(s).

Figure 1:
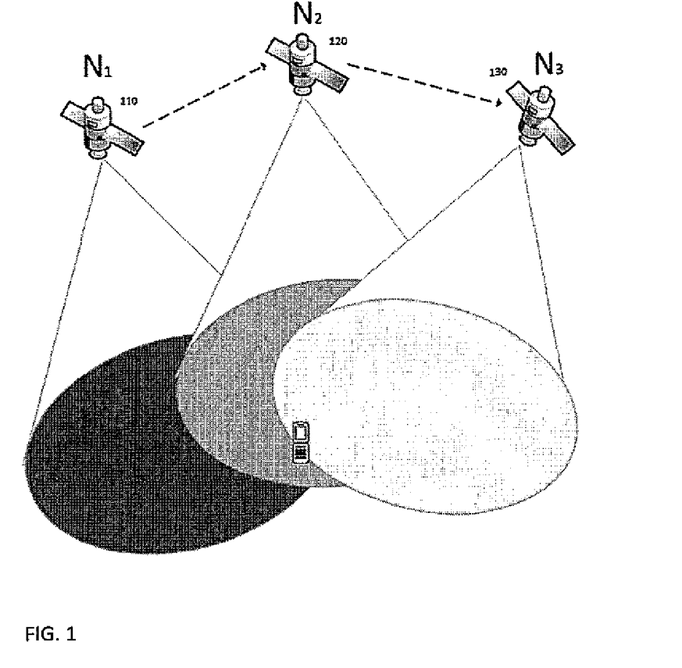
FIG. 1 shows an example of LEO satellite use case for the invention procedure.

FIG. 1 shows a low earth orbit (LEO) satellite equipped with a gNB radio unit with fixed beams for a communication network. As shown in FIG. 1 the satellite is moving along its orbit as shown with identifiers 110, 120, and 130 at time instances $N_1$, $N_2$, and $N_3$. It is noted that example embodiments of the invention can benefit operations performed in such a communication network as shown in FIG. 1.

Some inventive steps in accordance with example embodiments of the invention are summarized here and further detailed below:

As a low earth orbit (LEO) satellite equipped with a gNB with fixed beams moves along its orbit, the location management function (LMF) requests the position of a UE. FIG. 1 shows the scenario;

The gNB triggers the UE to transmit an SRS burst with a first periodicity $T_1$ (e.g., using DCI). The time of arrival (TOA) is measured at the gNB using the SRS;

The gNB triggers the UE to transmit an SRS burst with a second periodicity $T_2$ (e.g., using DCI); and The gNB reports UL TOA values along with position of satellite at times of measurement to the LMF to calculate the UE position. The LMF could be co-located with the gNB or could be at a ground station.

These steps as mentioned above include:

As a low earth orbit (LEO) satellite equipped with a gNB radio unit with fixed beams moves along its orbit, the location management function (LMF) requests the position of a UE. FIG. 1 shows the scenario;

The gNB triggers the UE to transmit an SRS burst with a first periodicity $T_1$ (e.g., using DCI or higher-layer configuration). The TOA is measured at the gNB using the SRS:

SRS burst can be used for velocity estimation among other parameters. At least velocity information can be used to judge the quality of the eventual positioning estimate;

A second periodicity, $T_2$, will be configured based on the mobility level determined with the SRS burst and is calculated at the gNB:

Note that gNB functions may be split between the satellite and a ground station communicating with the satellite, and processing of SRS bursts or individual signals can take place on board satellite or at the ground station.

Note that other UL signals such as Demodulation Reference Signal (DMRS), Phase Tracking Reference Signal (PTRS), random access signal or preamble, may also be used instead of the SRS.

The gNB triggers the UE to transmit an SRS burst with a second periodicity $T_2$ (e.g., using DCI or higher-layer configuration):

In one embodiment, if the UE is equipped with Inertial Measurement Unit (IMU) sensors the UE may itself update the configuration of SRS after transmitting the initial SRS configuration. This minimizes the signaling and latency of the positioning procedure further.

The gNB reports UL TOA values along with position of satellite at times of measurement to the LMF to calculate the UE position. The LMF could be co-located with the gNB or could be at a ground station:

Alternatively, the gNB could use the UL TOA values as well as its position at times of measurement to calculate the UE position locally.

Figure 2:
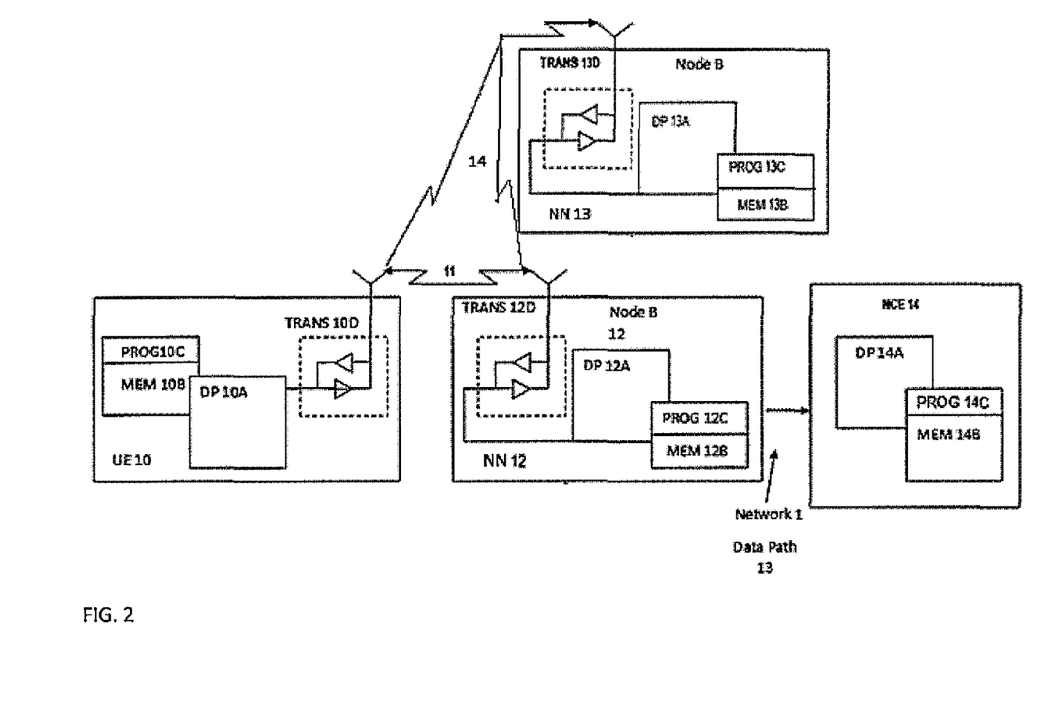
FIG. 2 shows a simplified block diagram of exemplary electronic devices that are suitable for use in practicing various exemplary embodiments of this invention.

Before describing the example embodiments of the invention in detail, reference is made to FIG. 2 for illustrating a simplified block diagram of various electronic devices that are suitable for use in practicing the example embodiments of this invention.

FIG. 2 shows a block diagram of one possible and non-limiting exemplary system in which the example embodiments of the invention may be practiced. In FIG. 2, a user equipment (UE) 10 is in wireless communication with a wireless network 1. A UE is a wireless, typically mobile device that can access a wireless network. The UE 10 includes one or more processors DP 10A, one or more memories MEM 10B, and one or more transceivers TRANS 10D interconnected through one or more buses. Each of the one or more transceivers TRANS 10D includes a receiver and a transmitter. The one or more buses may be address, data, or control buses, and may include any interconnection mechanism, such as a series of lines on a motherboard or integrated circuit, fiber optics or other optical communication equipment, and the like. The one or more transceivers TRANS 10D are connected to one or more antennas for communication 11 and 18 to NN 12 and NN 13, respectively. The one or more memories MEM 10B include computer program code PROG 10C. The UE 10 communicates with NN 12 and/or NN 13 via a wireless link 111.

The NN 12 (NR/5G Node B, an evolved NB, or LTE device) is a network node such as a master or secondary node base station (e.g., for NR or LTE long term evolution) that communicates with devices such as NN 13 and UE 10 of FIG. 2. The NN 12 provides access to wireless devices such as the UE 10 to the wireless network 1. The NN 12 includes one or more processors DP 12A, one or more memories MEM 12C, and one or more transceivers TRANS 12D interconnected through one or more buses. In accordance with the example embodiments these TRANS 12D can include X2 and/or Xn interfaces for use to perform the example embodiments of the invention. Each of the one or more transceivers TRANS 12D includes a receiver and a transmitter. The one or more transceivers TRANS 12D are connected to one or more antennas for communication over at least link 11 with the UE 10. The one or more memories MEM 12B and the computer program code PROG 12C are configured to cause, with the one or more processors DP 12A, the NN 12 to perform one or more of the operations as described herein. The NN 12 may communicate with another gNB or eNB, or a device such as the NN 13. Further, the link 11 and or any other link may be wired or wireless or both and may implement, e.g., an X2 or Xn interface. Further the link 11 may be through other network devices such as, but not limited to an NCE/MME/SGW device such as the NCE 14 of FIG. 2.

The NN 13 can comprise a mobility function device such as an AMF or SMF, further the NN 13 may comprise a NR/5G Node B or possibly an evolved NB a base station such as a master or secondary node base station (e.g., for NR or LTE long term evolution) that communicates with devices such as the NN 12 and/or UE 10 and/or the wireless network 1. The NN 13 includes one or more processors DP 13A, one or more memories MEM 13B, one or more network interfaces, and one or more transceivers TRANS 12D interconnected through one or more buses. In accordance with the example embodiments these network interfaces of NN 13 can include X2 and/or Xn interfaces for use to perform the example embodiments of the invention. Each of the one or more transceivers TRANS 13D includes a receiver and a transmitter connected to one or more antennas. The one or more memories MEM 13B include computer program code PROG 13C. For instance, the one or more memories MEM 13B and the computer program code PROG 13C are configured to cause, with the one or more processors DP 13A, the NN 13 to perform one or more of the operations as described herein. The NN 13 may communicate with another mobility function device and/or eNB such as the NN 12 and the UE 10 or any other device using, e.g., link 11 or another link. These links may be wired or wireless or both and may implement, e.g., an X2 or Xn interface. Further, as stated above the link 11 may be through other network devices such as, but not limited to an NCE/MME/SGW device such as the NCE 14 of FIG. 2.

The one or more buses of the device of FIG. 2 may be address, data, or control buses, and may include any interconnection mechanism, such as a series of lines on a motherboard or integrated circuit, fiber optics or other optical communication equipment, wireless channels, and the like. For example, the one or more transceivers TRANS 12D, TRANS 13D and/or TRANS 10D may be implemented as a remote radio head (RRH), with the other elements of the NN 12 being physically in a different location from the RRH, and the one or more buses 157 could be implemented in part as fiber optic cable to connect the other elements of the NN 12 to a RRH.

It is noted that although FIG. 2 shows network nodes Such as NN 12 and NN 13. Any of these nodes may be configured as an eNodeB or eNB or gNB such as for LTE and NR, may or may not be incorporated into a satellite, and would still be configurable to perform example embodiments of the invention.

Also it is noted that description herein indicates that "cells" perform functions, but it should be clear that the gNB that forms the cell and/or a user equipment and/or mobility management function device that will perform the functions. In addition, the cell makes up part of a gNB, and there can be multiple cells per gNB.

The wireless network 1 may include a network control element (NCE) 14 that may include MME (Mobility Management Entity)/SGW (Serving Gateway) functionality, and which provides connectivity with a further network, such as a telephone network and/or a data communications network (e.g., the Internet). The NN 12 and the NN 13 are coupled via a link 13 and/or link 14 to the NCE 14. In addition, it is noted that the operations in accordance with example embodiments of the invention, as performed by the NN 13, may also be performed at the NCE 14.

The NCE 14 includes one or more processors DP 14A, one or more memories MEM 14B, and one or more network interfaces (N/W I/F(s)), interconnected through one or more buses coupled with the link 13 and/or 14. In accordance with the example embodiments these network interfaces can include X2 and/or Xn interfaces for use to perform the example embodiments of the invention. The one or more memories MEM 14B include computer program code PROG 14C. The one or more memories MEM14B and the computer program code PROG 14C are configured to, with the one or more processors DP 14A, cause the NCE 14 to perform one or more operations which may be needed to support the operations in accordance with the example embodiments of the invention.

The wireless Network 1 may implement network virtualization, which is the process of combining hardware and software network resources and network functionality into a single, software-based administrative entity, a virtual network. Network virtualization involves platform virtualization, often combined with resource virtualization. Network virtualization is categorized as either external, combining many networks, or parts of networks, into a virtual unit, or internal, providing network-like functionality to software containers on a single system. Note that the virtualized entities that result from the network virtualization are still implemented, at some level, using hardware such as processors DP10, DP12A, DP13A, and/or DP14A and memories MEM 10B, MEM 12B, MEM 13B, and/or MEM 14B, and also such virtualized entities create technical effects.

The computer readable memories MEM 12B, MEM 13B, and MEM 14B may be of any type suitable to the local technical environment and may be implemented using any suitable data storage technology, such as semiconductor based memory devices, flash memory, magnetic memory devices and systems, optical memory devices and systems, fixed memory and removable memory. The computer readable memories MEM 12B, MEM 13B, and MEM 14B may be means for performing storage functions. The processors DP10, DP12A, DP13A, and DP14A may be of any type suitable to the local technical environment, and may include one or more of general purpose computers, special purpose computers, microprocessors, digital signal processors (DSPs) and processors based on a multi-core processor architecture, as non-limiting examples. The processors DP10, DP12A, DP13A, and DP14A may be means for performing functions, such as controlling the UE 10, NN 12, NN 13, and other functions as described herein.

One major advantage of using example embodiments of this invention is that it only requires a single satellite to position the UE. In NTN scenarios it is likely for UEs to only have a single satellite visible to them and therefore it requires a solution like the invention to have positioning support without requiring GNSS. As the scheme uses UL signals it also does not require the UE to make any measurements or reports. In this way the positioning scheme is very cost effective which is particularly important for IoT UEs which are envisioned to be the main users of NTN in the future.

Example embodiments of the invention therefore represents minimal overhead to be implemented. Some main advantages of the invention therefore include:
  Single satellite positioning method;
  No UE measurements or reporting required; and
  Minimal signaling overhead.

One aim in accordance with example embodiments of the invention is to allow NTN gNB to position a UE using UL signals.

In this regard, some background information relevant to related embodiments of the invention can be summarized as:
  NTN of LEO satellites with gNBs on board are orbiting the earth with fixed beams;
  UE is synchronized to the DL beam and UL Doppler compensation occurs before the UE transmits in the UL; and
  UE position is desired by network either only locally at gNB and/or in the core network.

Figure 4:
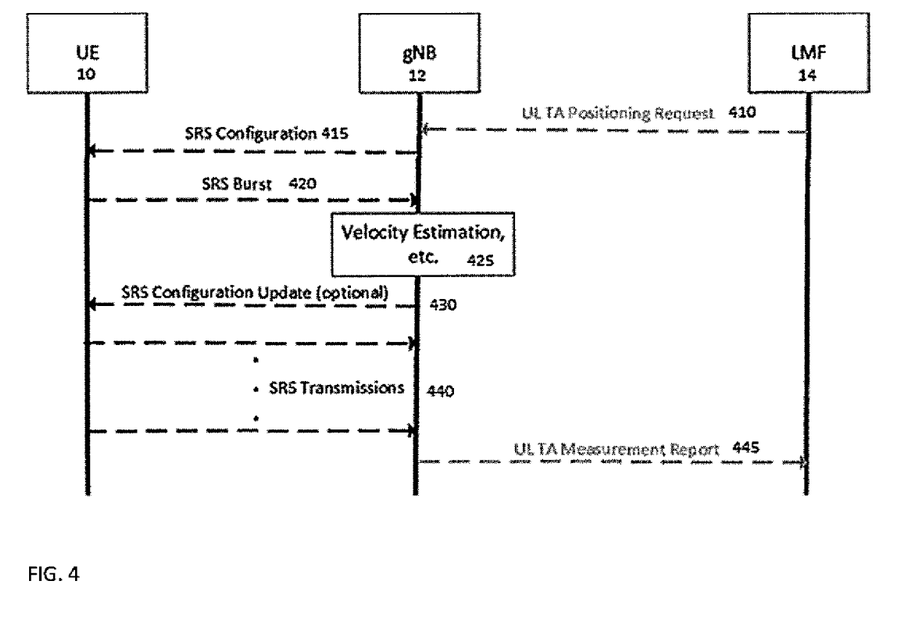
FIG. 4 shows an overview of example embodiments of the invention including new NRPPa signalling steps.

Further, key inventive steps in accordance with example embodiments of the invention are now described in more detail below:
  As LEO satellite moves along its orbit, the LMF requests the position of a UE;
  To facilitate tracking the UL TOA, periodic SRS is triggered, and an SRS burst is sent at the beginning of the procedure (e.g., using DCI or higher-layer configuration). In some embodiments the SRS periodicity or time instance may be previously set and may be used for example embodiments of the invention:
    SRS burst can be used for velocity estimation among other parameters. At least this velocity information can be used to judge the quality of the eventual positioning estimate:
      If the velocity is estimated to be high, then the position estimate may be of a lower quality and/or deemed to be not computable for very high mobility UE,
      If the UE is determined to be low mobility, then the gNB can track multiple UL TOA points over a few seconds to reduce the required SRS transmission in a given time interval. If the UE is determined to be higher mobility the longer SRS period may be adjusted to attempt to improve the position estimate, and
    In one embodiment the UL TOA could be the quantized timing advance (TA) which the gNB may also send to the UE. For UE based positioning this could enable the UE to get a positioning estimate without making the measurements directly. The UE would need to know the time of TA measurements and the satellite positions which could be communicated to it.
  The gNB triggers the UE to transmit an SRS burst with a second periodicity $T_2$ (e.g., using DCI or higher-layer configuration):
    In one embodiment, if the UE is equipped with Inertial Measurement Unit (IMU) sensors the UE may update the configuration of SRS after transmitting the initial SRS configuration. This minimizes the signaling and latency of the positioning procedure further:
      In the initial SRS configuration, a set of $T_2$ options can be set. Alternatively, some standardized values for this positioning method can be agreed upon. This set is then used to select the final $T_2$ value based on the UE mobility.
      If the UE knows from the IMU sensors that it is low mobility (i.e., below some agreed threshold) then it may select the longest SRS periodicity. If the UE knows it is high mobility it may select the shortest SRS periodicity.
    The IMU data (or UE mobility level) can be explicitly communicated to the gNB or implicitly communicated using the subcarrier position of the SRS for example.
      In the implicit case the comb offset within a PRB used for SRS configuration could tell the gNB which mobility level the UE has determined. This can be further checked with the gNB's own calculation of velocity from the SRS burst for higher accuracy.
  The gNB reports the UL arrival timing values along with position of satellite at times of measurement to the location management function (LMF) to calculate the UE position. The proposed new NRPPa signaling between the gNB and LMF which would be required in this embodiment is shown in FIG. 4.
    The LMF could be co-located with the positioning function of the gNB either on board a satellite or at a ground station.
    If LMF is located at the ground station (or connected to the ground station via the core network) then NRPPa signaling can be sent on the feeder link if needed.
    In one embodiment, the gNB would use the UL TOA values as well as the satellite position at time of measurement to calculate the UE position locally at the gNB.

Note that this method can be generally applicable to many scenarios where the radio unit of gNB is mobile and knows its locations. These include, for example, HAP, UAV, trains, trucks, V2X, MEO satellites, and ships. The position of the gNB that moves may be in a predefined manner (e.g., satellite orbit) or it may be equipped with an additional positioning feature (e.g., RTK-GNSS) that allows the position to be known even as the gNB moves.

Figure 3:
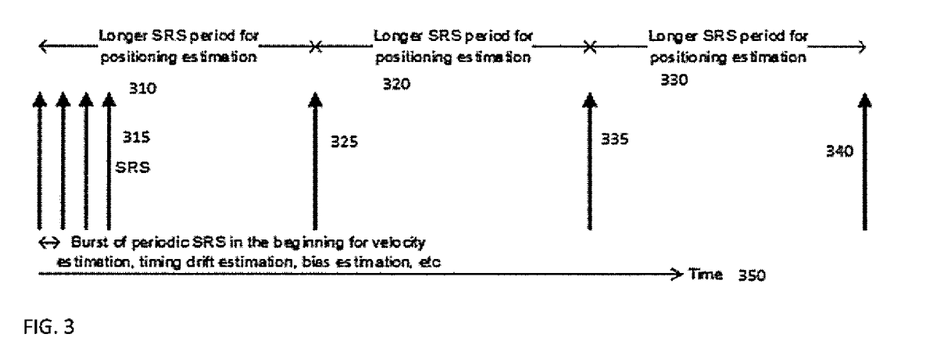
FIG. 3 shows a proposed SRS transmission schedule to enable example embodiments of the invention.

As shown in FIG. 3 there is shown a proposed SRS transmission schedule to enable example embodiments of the invention. As shown in FIG. 3 there are longer SRS periods 310, 320, and 330 for positioning information in which more than one periodic SRS burst 315, 325, 335, and 340 is performed. As shown in FIG. 3 the first burst 315 of periodic SRS are in the beginning of the SRS period for at least velocity estimation, timing drift information, bias information. In accordance with example embodiments of the invention the bursts 325, 335, and 340 are optional based on determinations using at least the first burst 315.

DL positioning methods for NTN have been proposed at the time of this application. This require the UE to make measurements over time which could be quite costly and then the UE needs to report the information back to the gNB. A major advantage of example embodiments of the invention include that it relies on UL signalling to make the measurements for UE positioning.

FIG. 4 shows an overview of example embodiments of the invention including new NRPPa signalling steps as shown as step 410 and step 445 as described below. As shown in FIG. 4 there is a UE 10 such as the UE 10 as in FIG. 2, a gNB 12 such as the gNB 12 as in FIG. 2, and an LMF 14. It is noted that the LMF 14 can be similarly incorporated into any of the UE 10 or gNB 12, or may be incorporated in an external network device such as the NCE 14 as in FIG. 2. As shown in step 410 of FIG. 4 the LMF 14 sends signalling towards the gNB 12 comprising a UL TA Positioning Request. Then in step 420 of FIG. 4, in response to the request the gNB 12 sends an SRS configuration towards the UE 10. As shown in step 420 of FIG. 4 the UE 10 responds to the gNB 12 with an SRS burst. After this, at step 425 of FIG. 4 the gNB 12 uses the SRS burst from the UE 10 to perform a velocity estimation. As shown in optional step 430 of FIG. 4 the gNb 12 sends, based on the SRS burst in step 420, a configuration update to the UE 10. This is optional as it is performed only when the velocity estimation, etc. of step 425 is not determinable based on the first SRS burst of step 420. The as shown in optional step 440 of FIG. 4 the UE 10 responds with further SRS transmissions based on the SRS configuration update of step 430. Then as shown in step 445 of FIG. 4 there is signalling from the gNB 12 towards the LMF 14 which includes UL TA measurement report.

Periodic SRS may already be scheduled for some UEs and example embodiments of the invention can take advantage of those transmissions. In this way little to no overhead is added in order to enable UE positioning for NTN. The high mobility of the LEO satellite is also used to enable a single gNB to position a UE where current NR positioning methods either rely on multiple gNBs or are highly inaccurate for a single gNB in the NTN scenario.

Figure 5A:
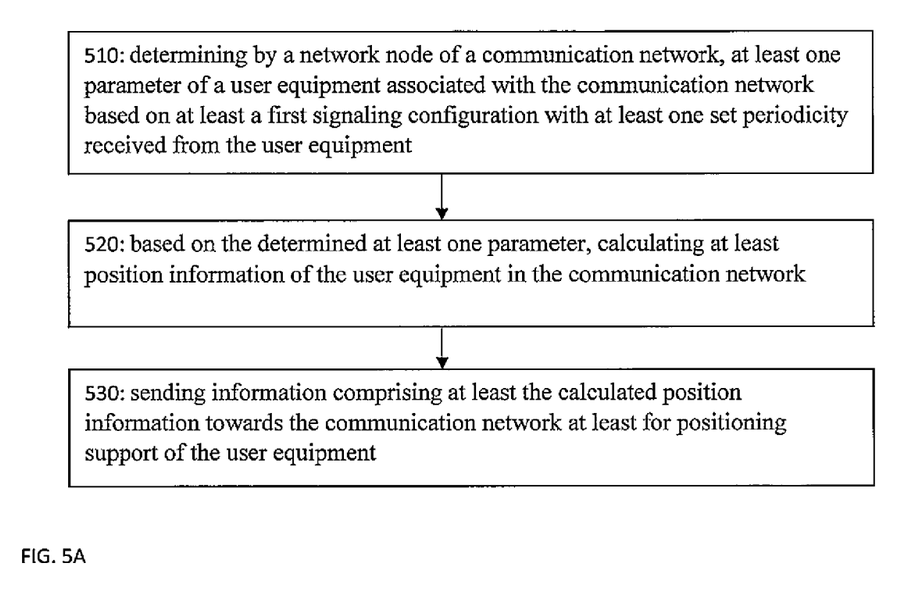
FIG. 5A and FIG. 5B each show a method in accordance with example embodiments of the invention which may be performed by an apparatus.

FIG. 5A illustrates method and/or operations which may be performed by a device such as, but not limited to, a device for example NN 12, and/or NN 13 as in FIG. 2. As shown in step 510 of FIG. 5A, there is determining by a network node of a communication network, at least one parameter of a user equipment associated with the communication network based on at least a first signaling configuration with at least one set periodicity received from the user equipment. As shown in step 520 of FIG. 5A there is, based on the determined at least one parameter, calculating at least position information of the user equipment in the communication network. Then as shown in step 530 of FIG. 5A there is sending information comprising at least the calculated position information towards the communication network at least for positioning support of the user equipment.

In the example aspect of example embodiments of the invention according to the paragraph above, wherein the determining is in response to receiving from the communication network signaling comprising a request of at least the position information of the user equipment in the communication network.

In the example aspect of example embodiments of the invention according to the paragraphs above, wherein the request is received from a location management function associated with the communication network.

In the example aspect of example embodiments of the invention according to the paragraphs above, wherein the network node is associated with at least one satellite, and wherein the information comprising at least the calculated position information is sent towards the communication network for positioning support of the user equipment from the at least one satellite.

In the example aspect of example embodiments of the invention according to the paragraphs above, wherein at least one of the network nodes or the location management function is co-located or embodied in the at least one satellite.

In the example aspect of the invention according to the paragraphs above, wherein the at least one signaling configuration comprises at least one sounding reference signal.

In the example aspect of example embodiments of the invention according to the paragraphs above, wherein the at least one signaling configuration comprises a first signaling configuration with a first periodicity received from the user equipment, and the method comprising: identifying based on the first signaling configuration with the first periodicity whether information associated with the determined at least one parameter of the user equipment is above or is below or is equal to a threshold identifying whether the calculated position information of the user equipment is determinable, wherein the information associated with the determined at least one parameter comprises information of at least one of a velocity or a mobility of the user equipment.

In the example aspect of example embodiments of the invention according to the paragraphs above, wherein based on the determined at least one parameter of the user equipment associated with the first signaling configuration with the first periodicity being above the threshold at least the position information is not determinable, and the method comprising: sending information comprising an indication of a second periodicity towards the user equipment, wherein the information causes at least a second signaling configuration with the second periodicity from the user equipment, and wherein the calculating at least the position information of the user equipment in the communication network is using both the first signaling configuration with the first periodicity and the second signaling configuration with the second periodicity.

In the example aspect of example embodiments of the invention according to the paragraphs above, wherein the at least one signaling configuration comprises a first signaling configuration with a first periodicity and a second signaling configuration with a second periodicity, and wherein an uplink time of arrival is determined by one of the network node or the communication network based on at least one of the first signaling configuration with the first periodicity or the second signaling configuration with the second periodicity.

In the example aspect of example embodiments of the invention according to the paragraphs above, wherein the at least one signaling configuration comprises a first signaling configuration with a first periodicity and a second signaling configuration with a second periodicity, and wherein the information sent towards the communication network comprises an uplink time of arrival determined based on at least one of the first signaling configuration with the first periodicity or the second signaling configuration with the second periodicity.

In the example aspect of example embodiments of the invention according to the paragraphs above, wherein based on the identifying that at least the position information of the user equipment is not determinable, the method comprising: decreasing a set periodicity of at least one of the first signaling configuration with the first periodicity or the second signaling configuration with the second periodicity to reduce a number of the more than one signaling configuration over a determined period of time.

In the example aspect of example embodiments of the invention according to the paragraphs above, wherein for a case it is identified that the determined at least one parameter of the user equipment associated with the first signaling configuration with the first periodicity is above the threshold, the method comprising: increasing the given periodicity of the more than one signaling configuration over a determined period of time; and determining at least the position information of the user equipment over the reduced number of the more than one signaling configuration.

In the example aspect of example embodiments of the invention according to the paragraphs above, wherein the communication network comprises a non-terrestrial network.

In the example aspect of example embodiments of the invention according to the paragraphs above, wherein the positioning support comprises determining a base station for use with the user equipment based on the determined mobility of the user equipment.

A non-transitory computer-readable medium (MEM 12B and/or MEM 13B and/or MEM 10B as in FIG. 2) storing program code (PROG 12C and/or PROG 13C and/or PROG 10C as in FIG. 2), the program code executed by at least one processor (DP 12A and/or DP 13A and/or DP 10A as in FIG. 2) to perform the operations as at least described in the paragraphs above.

In an example aspect of example embodiments of the invention, there is an apparatus, such as a network side apparatus, comprising: at least one processor; and at least one memory including computer program code, where the at least one memory and the computer program code are configured, with the at least one processor, to cause the apparatus to at least: determine at a network node of a communication network, at least one parameter of a user equipment associated with the communication network based on at least one signaling configuration with a set periodicity received from the user equipment; based on the determined at least one parameter, calculate at least position information of the user equipment in the communication network; and send information comprising at least the calculated position information towards the communication network at least for positioning support of the user equipment.

In another embodiment, an apparatus, comprising: at least one processor; and at least one memory including computer program code, where the at least one memory and the computer program code are configured, with the at least one processor, to cause the apparatus to perform any one of the methods described in the previous paragraphs.

In accordance with an example embodiment of the invention as described above there is an apparatus (NN 12, NN13, and/or UE 10) comprising: means for determining (TRANS 13D and/or TRANS 12D and/or TRANS 10D and MEM 13B and/or MEM 12B and/or MEM 10B storing PROG 13C and/or PROG 12C and/or PROG 10C executed by DP 13A and/or DP 12A and/or DP 10A as in FIG. 2) by a network node (NN 12 and/or NN 13 as in FIG. 2) of a communication network (network 1 as in FIG. 2), at least one parameter of a user equipment (UE 10 as in FIG. 2) associated with the communication network based on at least one signaling configuration with a at least one set periodicity received from the user equipment; means, based on the determined at least one parameter, for calculating (TRANS 13D and/or TRANS 12D and/or TRANS 10D and MEM 13B and/or MEM 12B and/or MEM 10B storing PROG 13C and/or PROG 12C and/or PROG 10C executed by DP 13A and/or DP 12A and/or DP 10A as in FIG. 2) at least position information of the user equipment in the communication network; then means for sending (TRANS 13D and/or TRANS 12D and/or TRANS 10D and MEM 13B and/or MEM 12B and/or MEM 10B storing PROG 13C and/or PROG 12C and/or PROG 10C executed by DP 13A and/or DP 12A and/or DP 10A as in FIG. 2) information comprising at least the calculated position information towards the communication network at least for positioning support of the user equipment.

In the example aspect of example embodiments of the invention according to the paragraph above, wherein at least the means for determining, means for calculating, and means for sending comprises transceiver [TRANS 13D and/or TRANS 12D and/or TRANS 10D as in FIG. 2] a non-transitory computer readable medium [MEM 13B and/or MEM 12B and/or MEM 10B] encoded with a computer program [PROG 13C and/or PROG 12C and/or PROG 10C] executable by at least one processor [DP 13A and/or DP 12A and/or DP 10A as in FIG. 2].

In another embodiment, an apparatus comprising means for performing a method according to any one of the example embodiments described in the previous paragraphs.

Figure 5B:
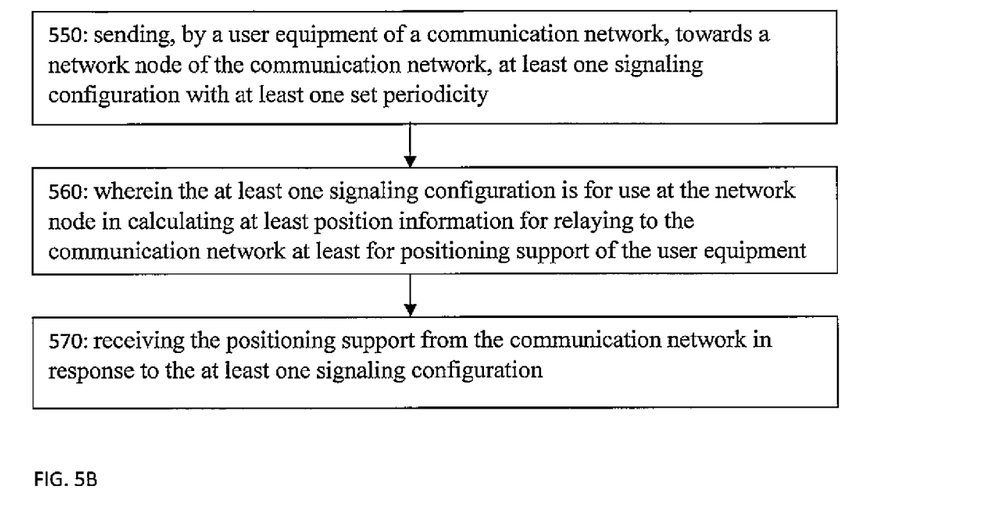

FIG. 5B illustrates method and/or operations which may be performed by a device such as, but not limited to, a device for example the UE 10 as in FIG. 2. As shown in step 550 of FIG. 5B there is shown sending, by a user equipment of a communication network, towards a network node of the communication network, at least one signaling configuration with at least one set periodicity. As shown in step 560 of FIG. 5B it is indicated wherein the at least one signaling configuration is for use at the network node in calculating at least position information for relaying to the communication network at least for positioning support of the user equipment. Then as shown in step 570 of FIG. 5B there is shown receiving the positioning support from the communication network in response to the at least one signaling configuration.

In the example aspect of example embodiments of the invention according to the paragraph above, wherein the at least one signaling configuration is sent in response to signaling received from the communication network signaling comprising a request of at least the position information of the user equipment in the communication network.

In the example aspect of example embodiments of the invention according to the paragraphs above, wherein the request is from a location management function communication network associated with the network node.

In the example aspect of example embodiments of the invention according to the paragraphs above, wherein the network node is associated with at least one satellite, and wherein the information comprising at least the calculated position information is sent towards the communication network for positioning support of the user equipment from the at least one satellite.

In the example aspect of example embodiments of the invention according to the paragraphs above, wherein at least one of the network node or the location management function is co-located or embodied in the at least one satellite.

In the example aspect of example embodiments of the invention according to the paragraphs above, wherein the at least one signaling configuration comprise at least one sounding reference signal.

In the example aspect of example embodiments of the invention according to the paragraphs above, wherein the at least one signaling configuration from the user equipment comprises a first signaling configuration with a first periodicity of the at least one set periodicity, and wherein based on identifying that at least one parameter of the user equipment associated with the first signaling configuration with the first periodicity is above or is below or is equal to a threshold is identifying whether or not calculated position information of the user equipment is determinable, wherein the threshold is associated with the identified at least one parameter of the user equipment, wherein the at least one parameter comprise at least one of a velocity or a mobility of the user equipment.

In the example aspect of example embodiments of the invention according to the paragraphs above, wherein based on the identified at least one parameter of the user equipment associated with the first signaling configuration with the first periodicity being above the threshold, it is indicated that at least the calculated position information is not determinable, and the method comprising: receiving, by the user equipment, information comprising an indication of a second periodicity of the at least one set periodicity, and the method comprising: based on the indication of the second periodicity, sending at least one second signaling configuration with the second periodicity towards the network node, wherein calculating at least the position information of the user equipment in the communication network is using both the first signaling configuration with the first periodicity and the at least one second signaling configuration with the second periodicity.

In the example aspect of example embodiments of the invention according to the paragraphs above, wherein based on the identified at least one parameter of the user equipment associated with the first signaling configuration with the first periodicity being below the threshold at least the position information of the user equipment not being determinable and the set periodicity of at least one of the first signaling configuration with the first periodicity or the at least one second signaling configuration with the second periodicity is reducing a number of the more than one signaling configuration over a determined period of time.

In the example aspect of example embodiments of the invention according to the paragraphs above, wherein for a case it is identified that the identified at least one parameter of the user equipment associated with the first signaling configuration with the first periodicity is above the threshold, the method comprising: the set periodicity of at least one of the first signaling configuration with the first periodicity or the at least one second signaling configuration with the second periodicity is increased to reduce a number of the more than one signaling configuration over a determined period of time.

In the example aspect of example embodiments of the invention according to the paragraphs above, there is, based on the first signaling configuration with the first periodicity being above the threshold, selecting, by user equipment, a longer periodicity for sending at least one second signaling configuration with a second periodicity towards the network node.

In the example aspect of example embodiments of the invention according to the paragraphs above, wherein based on a determined at least one of the velocity or the mobility of the user equipment being one of above or is below or equal to a threshold, one of increasing or decreasing, by the user equipment, time instances set for at least one of the first signaling configuration with the first periodicity or the at least one second signaling configuration with the second periodicity.

A non-transitory computer-readable medium (MEM 10B as in FIG. 2) storing program code (PROG 10C as in FIG. 2), the program code executed by at least one processor (DP 10A as in FIG. 2) to perform the operations as at least described in the paragraphs above.

In an example aspect of example embodiments of the invention, there is an apparatus, such as a network side apparatus, comprising: at least one processor; and at least one memory including computer program code, where the at least one memory and the computer program code are configured, with the at least one processor, to cause the apparatus to at least: send, at a user equipment of a communication network, towards a network node of the communication network, at least one signaling configuration with at least one set periodicity, wherein the at least one signaling configuration is for use at the network node in calculating at least position information for relaying to the communication network at least for positioning support of the user equipment; and receive the positioning support from the communication network in response to the at least one signaling configuration.

In another embodiment, an apparatus, comprising: at least one processor; and at least one memory including computer program code, where the at least one memory and the computer program code are configured, with the at least one processor, to cause the apparatus to perform any one of the methods described in the previous paragraphs.

In accordance with an example embodiment of the invention as described above there is an apparatus (UE 10 as in FIG. 2) comprising: means for sending (TRANS 10D and MEM 10B storing PROG 10C executed by DP 13A and/or DP 12A and/or DP 10A as in FIG. 2), by a user equipment (UE 10 as in FIG. 2) of a communication network (for example Network 1 as in FIG. 2), towards a network node (NN12 and/or NN 13 as in FIG. 2) associated the communication network, at least one signaling configuration with at least one set periodicity; means for wherein the at least one signaling configuration is for use (TRANS 10D and MEM 10B storing PROG 10C executed DP 10A as in FIG. 2) by the network node to calculate (TRANS 10D and MEM 10B storing PROG 10C executed by DP 10A as in FIG. 2) at least position information for relaying to the communication network at least for positioning support of the user equipment; and means for receiving (TRANS 10D and MEM 10B storing PROG 10C executed by DP 10A as in FIG. 2) the positioning support from the communication network in response to the at least one signaling configuration.

In the example aspect of example embodiments of the invention according to the paragraph above, wherein at least the means for sending, means for calculating, and means for sending comprises transceiver [TRANS 10D as in FIG. 2] a non-transitory computer readable medium [MEM 10B] encoded with a computer program [PROG 10C] executable by at least one processor [DP 10A as in FIG. 2].

In another embodiment, an apparatus comprising means for performing a method according to any one of the example embodiments described in the previous paragraphs.

In general, the various embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

The word "exemplary" is used herein to mean "serving as an example, instance, or illustration." Any embodiment described herein as "exemplary" is not necessarily to be construed as preferred or advantageous over other embodiments. All of the embodiments described in this Detailed Description are exemplary embodiments provided to enable persons skilled in the art to make or use the invention and not to limit the scope of the invention which is defined by the claims.

The foregoing description has provided by way of exemplary and non-limiting examples a full and informative description of the best method and apparatus presently contemplated by the inventors for carrying out the invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention.

It should be noted that the terms "connected," "coupled," or any variant thereof, mean any connection or coupling, either direct or indirect, between two or more elements, and may encompass the presence of one or more intermediate elements between two elements that are "connected" or "coupled" together. The coupling or connection between the elements can be physical, logical, or a combination thereof. As employed herein two elements may be considered to be "connected" or "coupled" together by the use of one or more wires, cables and/or printed electrical connections, as well as by the use of electromagnetic energy, such as electromagnetic energy having wavelengths in the radio frequency region, the microwave region and the optical (both visible and invisible) region, as several non-limiting and non-exhaustive examples.

Furthermore, some of the features of the preferred embodiments of this invention could be used to advantage without the corresponding use of other features. As such, the foregoing description should be considered as merely illustrative of the principles of the invention, and not in limitation thereof.

The invention claimed is:

1. An apparatus comprising:
at least one processor; and
at least one memory including computer program code, wherein the at least one memory and the computer program code are configured, with the at least one processor, to cause the apparatus to at least:
send, to a network node of a communication network, at least one signaling configuration with at least one set periodicity, wherein the at least one signaling configuration is for use at the network node in calculating at least position information for relaying to the communication network at least for positioning support of the apparatus, and
receive positioning support from the communication network in response to the at least one signaling configuration,
wherein the at least one signaling configuration from the apparatus comprises a first signaling configuration with a first periodicity of the at least one set periodicity, and
wherein at least one parameter of the apparatus associated with the first signaling configuration with the first periodicity being above or below or equal to a threshold is used for identifying whether or not calculated position information of the apparatus is determinable, wherein the threshold is associated with the at least one parameter of the apparatus, wherein the at least one parameter comprises at least one of a velocity or a mobility of the apparatus.

2. The apparatus according to claim 1, wherein the at least one signaling configuration is sent in response to signaling received from the communication network comprising a request of at least the position information of the apparatus in the communication network.

3. The apparatus according to claim 2, wherein the request is from a location management function associated with the communication network.

4. The apparatus according to claim 1, wherein the network node is associated with at least one satellite.

5. The apparatus according to claim 4, wherein the at least position information is sent to the communication network for positioning support of the apparatus from the at least one satellite.

6. The apparatus according to claim 4, wherein at least one of the network node or the location management function is co-located or embodied in the at least one satellite.

7. The apparatus according to claim 1, wherein the at least one signaling configuration comprise at least one sounding reference signal.

8. The apparatus according to claim 1, wherein the at least one parameter of the apparatus associated with the first signaling configuration with the first periodicity being above the threshold indicates that the calculated position information is not determinable, and wherein the at least one memory and the computer program code are configured, with the at least one processor, to cause the apparatus to:
receive information comprising an indication of a second periodicity of the at least one set periodicity, and
send, based on the indication of the second periodicity, at least one second signaling configuration with the second periodicity towards the network node,
wherein calculating at least the position information of the apparatus in the communication network comprises using the first signaling configuration with the first periodicity and the at least one second signaling configuration with the second periodicity.

9. The apparatus according to claim 1, wherein the at least one parameter of the apparatus associated with the first signaling configuration with the first periodicity being below the threshold indicates the calculated position information of the apparatus not being determinable and causes increasing the set periodicity of at least one of the first signaling configuration with the first periodicity or at least one second signaling configuration with a second periodicity to reduce a number of the more than one signaling configuration over a determined period of time.

10. The apparatus according to claim 1, where the at least one memory and the computer program code are configured, with the at least one processor, to cause the apparatus to:
   increase or decrease, based on a determined at least one of the velocity or the mobility of the apparatus being one of above or below or equal to a threshold, time instances set for at least one of the first signaling configuration with the first periodicity or at least one second signaling configuration with a second periodicity.

* * * * *